(12) United States Patent
Tanaka et al.

(10) Patent No.: US 11,099,087 B2
(45) Date of Patent: Aug. 24, 2021

(54) TORQUE DETECTING DEVICE

(71) Applicants: DENSO CORPORATION, Kariya (JP); SOKEN, INC., Nisshin (JP)

(72) Inventors: Ken Tanaka, Nisshin (JP); Toshiro Suzuki, Kariya (JP); Satoru Jinno, Kariya (JP); Shigetoshi Fukaya, Kariya (JP)

(73) Assignees: DENSO CORPORATION, Kariya (JP); SOKEN, INC., Nisshin (JP)

( * ) Notice: Subject to any disclaimer, the term of this patent is extended or adjusted under 35 U.S.C. 154(b) by 179 days.

(21) Appl. No.: 16/561,748

(22) Filed: Sep. 5, 2019

(65) Prior Publication Data

US 2019/0391025 A1 Dec. 26, 2019

Related U.S. Application Data

(63) Continuation of application No. PCT/JP2018/010541, filed on Mar. 16, 2018.

(30) Foreign Application Priority Data

Mar. 31, 2017 (JP) .............................. JP2017-072282

(51) Int. Cl.
*G01L 3/10* (2006.01)
*G01L 5/22* (2006.01)

(52) U.S. Cl.
CPC .............. *G01L 3/105* (2013.01); *G01L 5/221* (2013.01)

(58) Field of Classification Search
CPC .......... G01L 3/104; G01L 3/105; G01L 5/221

USPC ...................... 73/862.331–862.338
See application file for complete search history.

(56) References Cited

U.S. PATENT DOCUMENTS

| | | | |
|---|---|---|---|
| 7,089,809 B2 | 8/2006 | Nakane et al. | |
| 8,776,619 B2* | 7/2014 | Jammer | G01L 3/104 |
| | | | 73/862.333 |
| 8,984,964 B2* | 3/2015 | Lee | G01L 3/104 |
| | | | 73/862.193 |
| 10,274,385 B2* | 4/2019 | Nishiguchi | G01L 3/104 |
| 2002/0189371 A1 | 12/2002 | Nakane et al. | |

(Continued)

FOREIGN PATENT DOCUMENTS

| | | |
|---|---|---|
| JP | 2006-047188 A | 2/2006 |
| JP | 2006-133011 A | 5/2006 |

(Continued)

*Primary Examiner* — Octavia Hollington
(74) *Attorney, Agent, or Firm* — Posz Law Group, PLC

(57) ABSTRACT

A torque detecting device detects a torsional torque between a first shaft and a second shaft based on a torsional displacement of a resilient member linking the first shaft and the second shaft coaxially. The torque detecting device is provided with: a magnet fixed to the first shaft; a first yoke fixed to the second shaft and arranged to be rotatable with respect to the magnet; a second yoke fixed to the second shaft and arranged to be rotatable together with the first yoke with respect to the magnet; a magnetic flux collector which collects magnetic flux; and a magnetic sensor which detects magnetic flux density. The magnetic flux collector is located to face both the first yoke and the second yoke. The magnetic sensor is located between the first yoke, from among the first yoke and the second yoke, and the magnetic flux collector, and detects the magnetic flux density between the first yoke and the magnetic flux collector.

14 Claims, 8 Drawing Sheets

(56) References Cited

U.S. PATENT DOCUMENTS

2003/0209087 A1 11/2003 Nakane et al.
2012/0285266 A1 11/2012 Takahashi et al.

FOREIGN PATENT DOCUMENTS

| JP | 4656851 B2 | 3/2011 |
| JP | 2013-205032 A | 10/2013 |
| JP | 2016-114405 A | 6/2016 |

* cited by examiner

TORQUE DETECTING DEVICE

CROSS REFERENCE TO RELATED APPLICATION

The present application is a continuation application of International Patent Application No. PCT/JP2018/010541 filed on Mar. 16, 2018, which designated the U.S. and claims the benefit of priority from Japanese Patent Application No. 2017-072282 filed on Mar. 31, 2017. The entire disclosures of all of the above applications are incorporated herein by reference.

FIELD

The present disclosure relates to a torque detecting device, which detects a torsional torque.

BACKGROUND ART

Conventionally, it is known that a torque detecting device (torque sensor) for detecting a torsional torque (shaft torque or twisting torque) is used in an electric power steering device or the like. For example, in a conventional torque sensor, a pair of yokes is relatively displaced relative to a multipolar magnet in a circumferential direction when a torsion bar connecting an input shaft and an output shaft is twisted. At this time, a magnetic sensor detects a magnetic flux density between the yokes, and detects a torsional torque based on a change in the magnetic flux density.

In such a torque sensor, various configurations are provided to improve detection accuracy of the torsional torque.

In one example, an outer edge of one yoke is raised to approach the other yoke, and a magnetic sensor is located between the outer edges. In this torque sensor, a gap between the yokes is reduced and hence the magnetic sensor can easily detect the magnetic flux density and improve the detection accuracy of the torsional torque.

In another example a pair of magnetic flux collecting rings is provided between yokes to induce magnetic flux from the yoke. In this configuration, a magnetic sensor is located between a pair of magnetic flux collecting rings to detect a magnetic flux density between the pair of magnetic flux collecting rings. As a result, a gap is reduced, and the magnetic sensor can easily detect the magnetic flux density. Further, by detecting the magnetic flux density through the magnetic flux collecting rings, it is possible to average detected magnetic flux densities and thereby improve detection accuracy of the torsional torque.

SUMMARY

A torque detecting device is provided for detecting a torsional torque between a first shaft and a second shaft based on a torsional torque of a resilient member, which connects the first shaft and the second shaft coaxially. The torque detecting device comprises a magnet fixed to the first shaft, a first yoke fixed to the second shaft and arranged to be rotatable relative to the magnet, a second yoke fixed to the second shaft and arranged to be rotatable with the first yoke relative to the magnet, a magnetic flux collector for collecting magnetic flux, and a magnetic sensor for detecting a magnetic flux density. The magnetic flux collector is located to face the first yoke and the second yoke. The magnetic sensor is located between the first yoke and the magnetic flux collector to detect the magnetic flux density between the first yoke and the magnetic flux collector.

EMBODIMENT

First Embodiment

Figure 1:
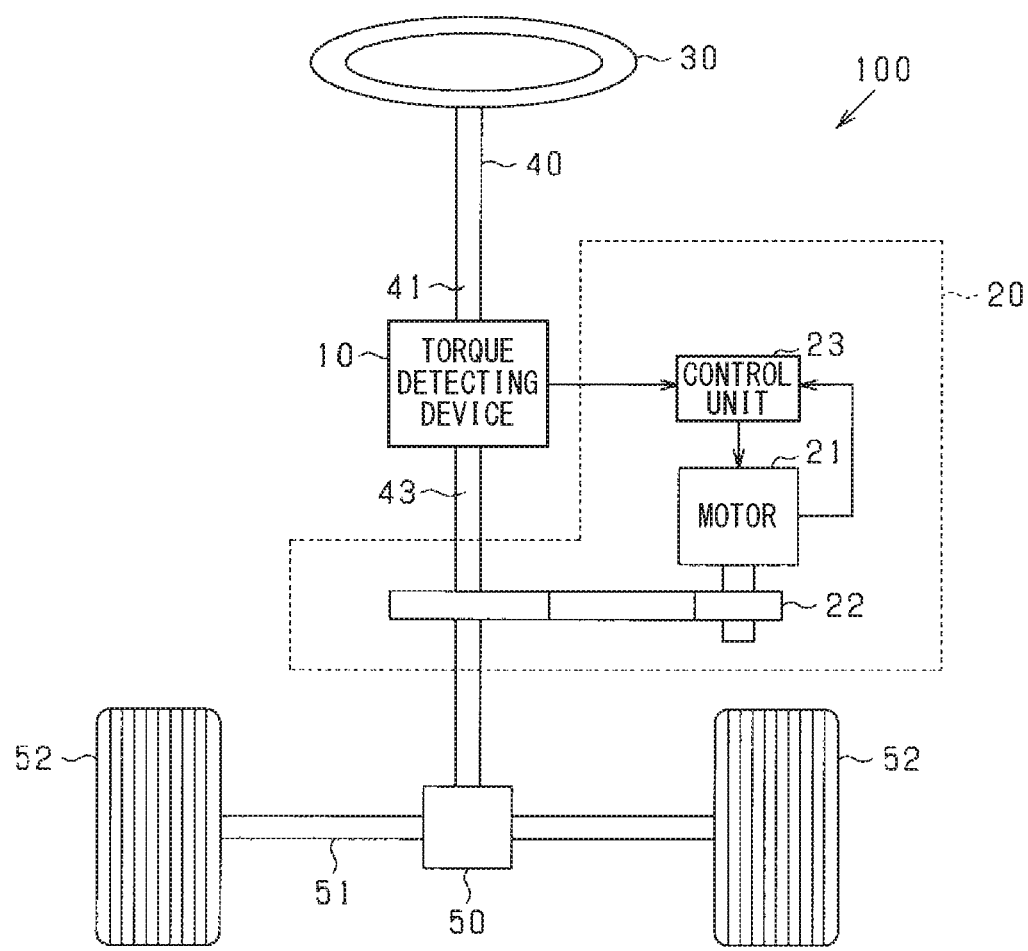
FIG. 1 is a schematic illustration of a steering system which includes a torque detecting device according to various embodiments.

Hereinafter, various embodiments of a torque detecting device of the present disclosure will be described with reference to the drawings. In the following embodiments, the same reference numerals are given to the same or equivalent parts in the drawings.

Steering System 100

A torque detecting device 10 will be described with reference to the drawings. As shown in FIG. 1, the torque detecting device 10 is used, for example, in a steering system 100 provided with an electric power steering apparatus 20 for assisting a steering operation of a vehicle.

Figure 2:
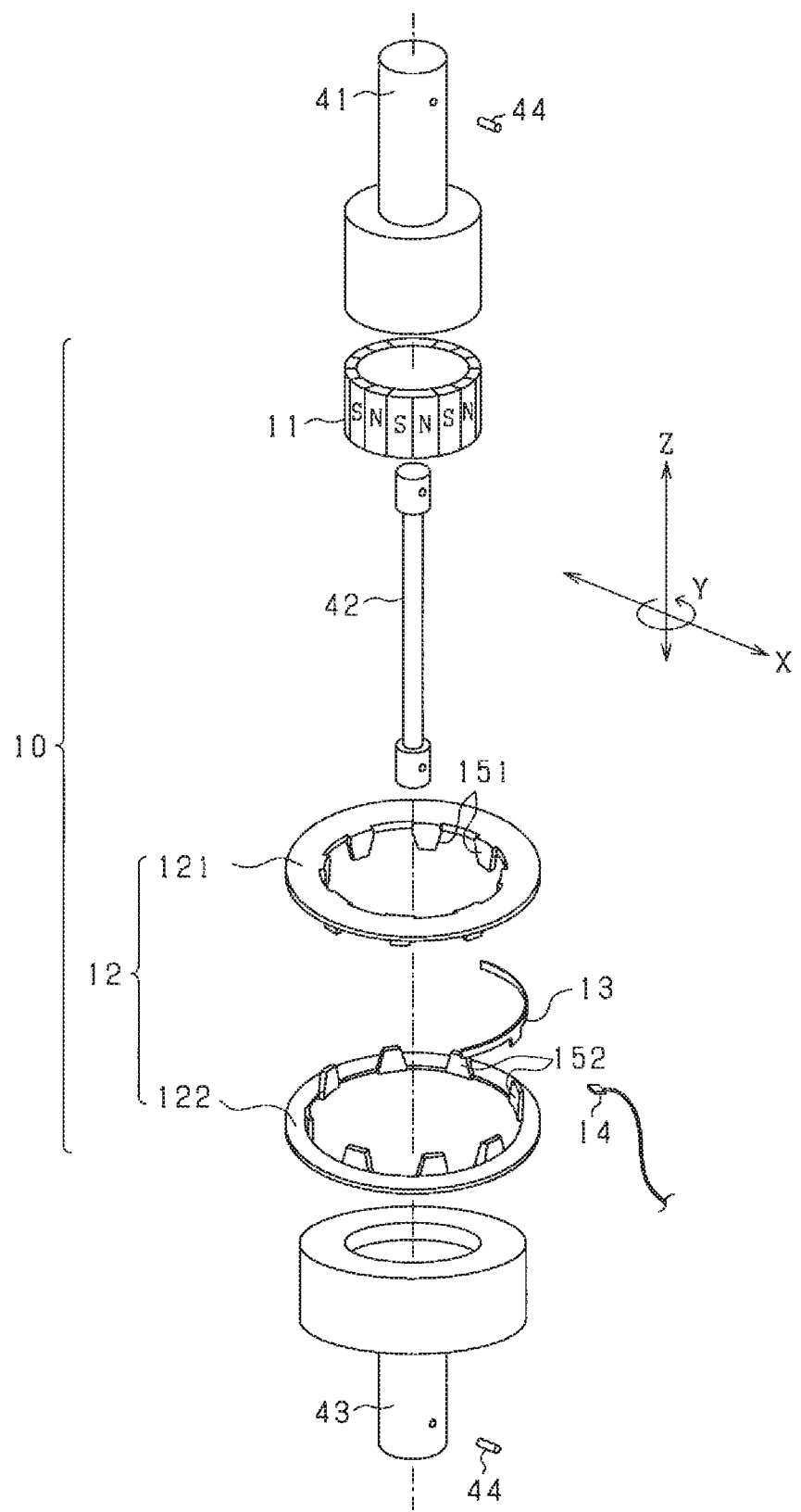
FIG. 2 is an exploded perspective view of a torque detecting device according to a first embodiment.

A steering wheel 30 is connected to a steering shaft 40. As shown in FIG. 2, the steering shaft 40 includes an input shaft 41 as a first shaft connected to the steering wheel 30, a torsion bar 42 connected to the input shaft 41, and an output shaft 43 as a second shaft connected to the input shaft 41 through the torsion bar 42.

One end side of the torsion bar 42 is fixed to the input shaft 41, and the other end side of the same is fixed to the output shaft 43 by fixing pins 44. The input shaft 41 and the output shaft 43 are thus coaxially linked to each other. The torsion bar 42 is a rod-like resilient member, and is torsionally displaced in response to a torsional torque (twisting torque) applied to the steering shaft 40 to store a resilient force. As shown in FIG. 1, the torque detecting device 10 is provided between the input shaft 41 and the output shaft 43 to detect a torsional torque applied to the torsion bar 42 (i.e., steering shaft 40).

A pinion gear 50 is provided at a top end of the output shaft 43, and engaged with a rack shaft 51. A pair of road wheels 52 is connected to both ends of the rack shaft 51 via tie rods or the like. Thus, when a driver rotates the steering wheel 30, the steering shaft 40 connected to the steering wheel 30 is rotated. When the steering shaft 40 rotates, the pinion gear 50 moves the rack shaft 51 linearly in the left-right direction. Then, in accordance with the displacement amount of the rack shaft 51, the pair of road wheels 52 is steered.

The electric power steering apparatus 20 includes a motor 21, which outputs assist torque for assisting the steering operation of the steering wheel 30 performed by the driver, a reduction gear 22, a control unit 23 and the like. The reduction gear 22 decelerates rotation of the motor 21 and transmits it to the steering shaft 40. In the first embodiment, a column assist type is used. However, a pinion assist type which transmits the rotation of the motor 21 to the pinion gear 50 or a rack assist type which transmits the rotation of the motor 21 to the rack shaft 51 may be used. The control unit 23 receives a voltage signal indicating a torsional torque from the torque detecting device 10, and controls driving of the motor 21 in correspondence to the acquired voltage signal.

In the following description, an axial direction of the steering shaft 40 (including the input shaft 41, the torsion bar 42 and the output shaft 43) is simply referred to as the axial direction. Moreover, a radial direction of the steering shaft 40 is simply referred to as the radial direction, and a circumferential direction of the steering shaft 40 is simply referred to as the circumferential direction. Further, in the figures, the axial direction, the radial direction and the circumferential direction of the steering shaft 40 are indicated by arrows Z, X and Y, respectively.

Torque Detecting Device 10

As shown in FIG. 2, the torque detecting device 10 includes a magnet 11 fixed to the input shaft 41, a pair of magnetic yokes 12 fixed to the output shaft 43, a magnetic flux collector 13 collecting magnetic flux from the magnetic yokes 12, a magnetic sensor 14 (see FIGS. 4 to 6) for detecting a magnetic flux density, and the like.

Magnet 11

The magnet 11 is formed of a hard magnetic material in a cylindrical shape. The magnet 11 is magnetized to N poles and S poles alternately in the circumferential direction on an outer periphery. In the first embodiment, the number of N poles and S poles in the circumferential direction is eight pairs, that is, a total of 16 poles. That is, the magnet 11 is magnetized with the N pole and the S pole alternately in the circumferential direction every predetermined angle corresponding to a magnetic pole pitch (22.5 degrees). The number of magnetic poles of the magnet 11 is not limited to 16 but may be any even number. The magnet 11 is coaxially fixed to the input shaft 41.

Magnetic Yoke 12

Figure 3:
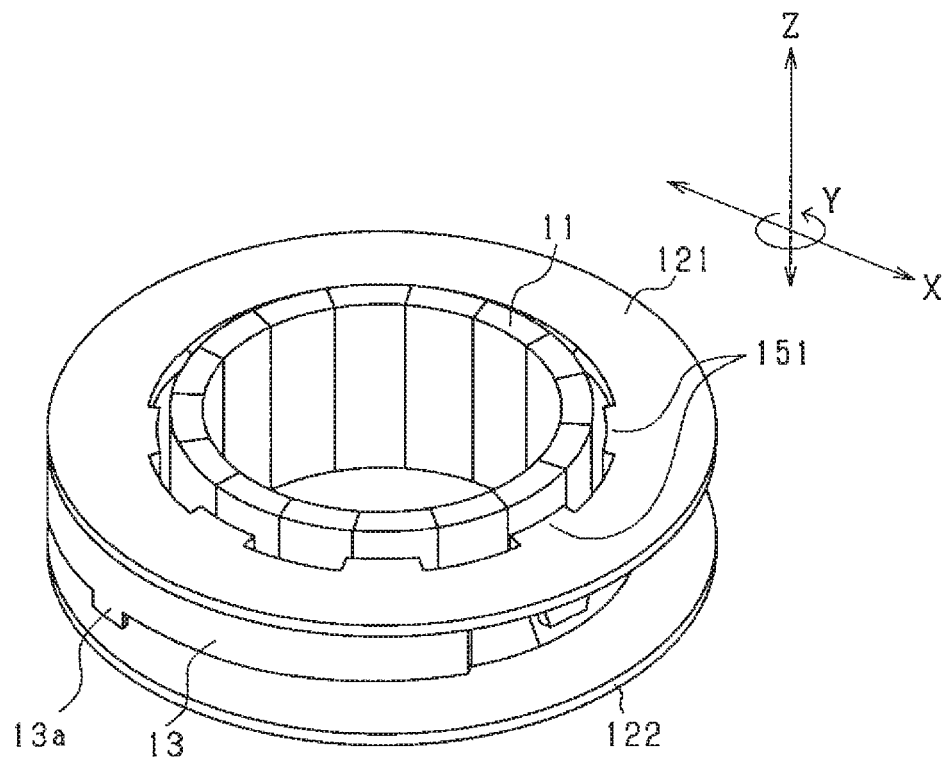
FIG. 3 is a perspective view of a magnetic yoke and a magnet in the first embodiment.

As shown in FIG. 2 and FIG. 3, the pair of magnetic yokes 12 is arranged to be separated in the axial direction. The arrangement between the magnetic yokes 12 is fixed by a resin mold (resin molding) of the pair of magnetic yokes 12 or by a spacer such as a nonmagnetic material. Here, one of the magnetic yokes 12 located at the input shaft 41 side is referred to as a yoke 121, and the other of the magnetic yokes 12 located on the output shaft 43 side is referred to as a yoke 122.

Yokes 121, 122

The yokes 121 and 122 will be described in detail. The yokes 121 and 122 are both annularly formed of a soft magnetic material (for example, permalloy). As shown in FIG. 2, the yokes 121 and 122 are coaxially fixed to the output shaft 43. The yoke 121 is provided with a plurality of claws 151 extending in one axial direction, that is, toward the yoke 122, at its radially inner edge. Similarly, the yoke 122 also is provided with a plurality of claws 152 extending in the other axial direction, that is, toward the yoke 121, at its radially inner edge. The yoke 121 and the yoke 122 are provided to be symmetrical.

Figure 4:
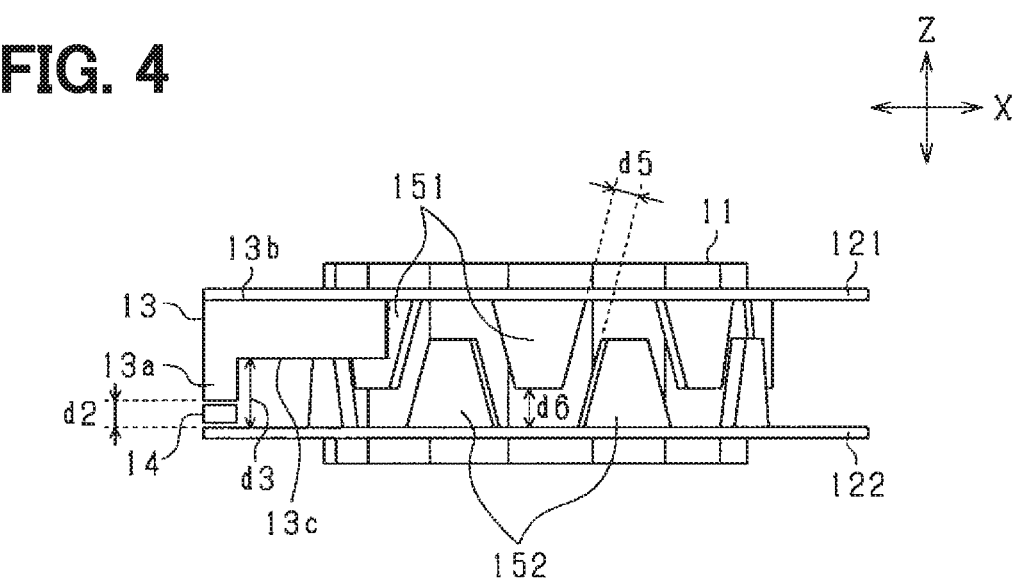
FIG. 4 is a side view of the magnetic yoke and the magnet in the first embodiment.
Figure 5A:
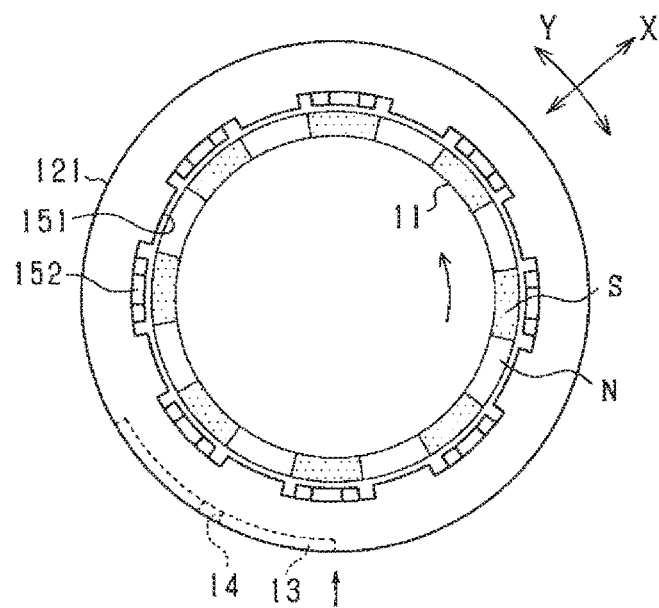
FIGS. 5A to 5C are plan views of the magnetic yoke in the first embodiment.
Figure 5B:
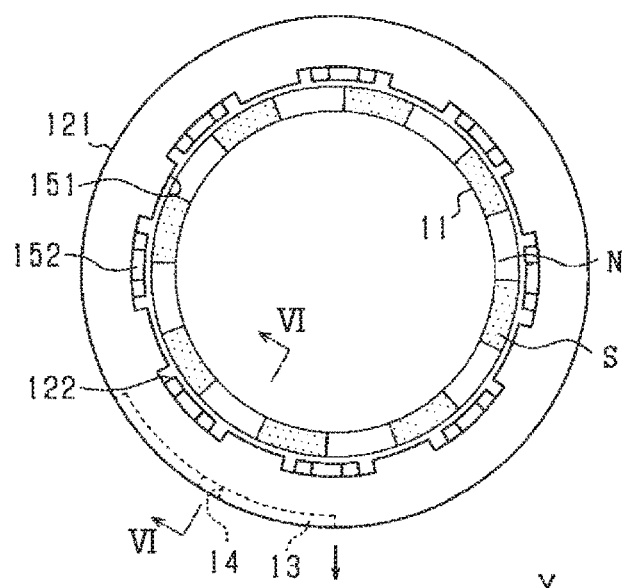
Figure 5C:
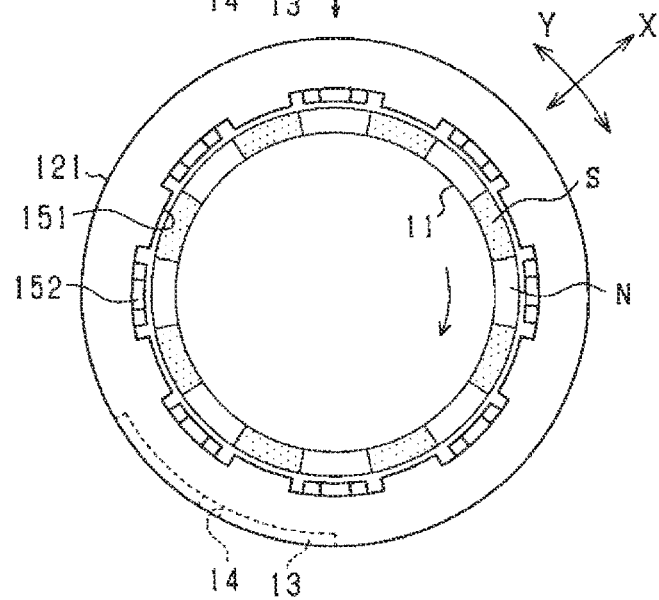
Figure 6:
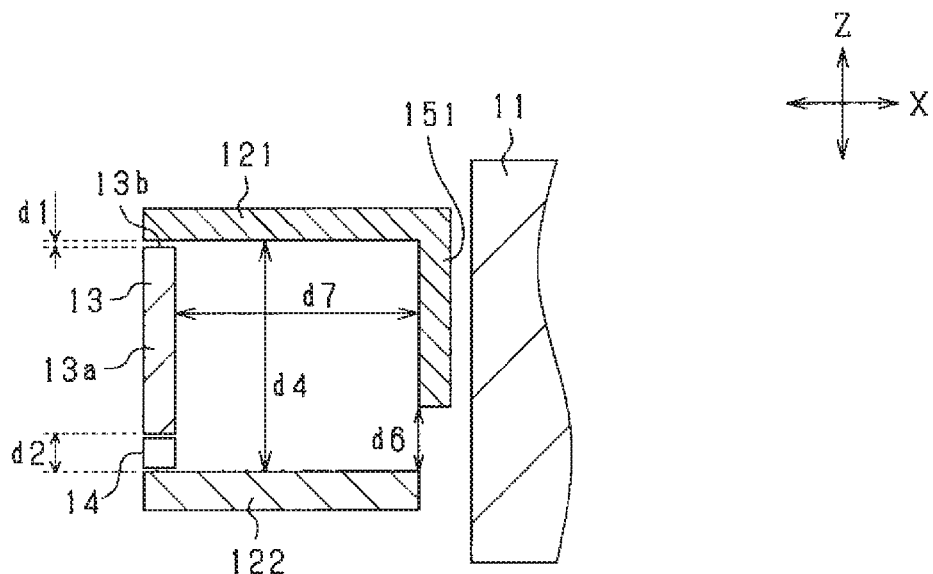
FIG. 6 is an end surface view of a cut portion of the magnetic yoke in the first embodiment.

As shown in FIGS. 5A, 5B and 5C, inner diameters of the yokes 121 and 122 are made larger than an outer diameter of the magnet 11. Therefore, the yokes 121 and 122 are separated from the magnet 11 and do not contact the magnet 11. The yokes 121 and 122 fixed to the output shaft 43 are arranged to be rotatable in the circumferential direction with respect to the magnet 11 fixed to the input shaft 41. FIG. 6 is a cross sectional view of an assembly taken along a line VI-VI in FIG. 5B. As shown in FIGS. 4 and 6, the outer diameter of the yoke 121 is the same as the outer diameter of the yoke 122. Further, the inner diameter of the yoke 121 and the inner diameter of the yoke 122 are the same.

As shown in FIG. 6, the yokes 121 and 122 are formed in a thin plate shape, and are provided to extend in a direction orthogonal to the axial direction. The yokes 121 and 122 are arranged to surround the outer periphery of the magnet 11. That is, the yokes 121 and 122 are located outside the magnet 11 in the radial direction.

Claws 151, 152

Next, the claws 151 and 152 will be described. As shown in FIGS. 5A to 5C, the claws 151 and 152 are provided in the same number (8 in the first embodiment) as the pole pairs of the magnet 11. The claws 151 and 152 are provided at equal intervals along the radially inner edges of the yokes 121 and 122, respectively. That is, the plurality of claws 151 and 152 are provided in correspondence to the magnetic pole pitch of the magnet 11. The claws 151 of the yoke 121 and the claws 152 of the yoke 122 are alternately arranged in a circumferentially shifted manner. The numbers of claws 151 and 152 may be different from the number of poles of the magnet 11.

The claws 151 and 152 are located to face the radially outer periphery of the magnet 11. As shown in FIG. 5B, when no torsional displacement occurs in the torsion bar 42, that is, when no torsional torque is applied to the steering shaft 40, each center of the claws 151 and 152 is in alignment with a boundary between the N pole and the S pole of the magnet 11 in the circumferential direction, that is, on a same radial line passing through the central axis of the magnetic yoke 12. The magnet 11 and the magnetic yoke 12 are not in contact with each other.

As shown in FIGS. 4 and 6, the claws 151 of the yoke 121 are provided so as to extend from the yoke 121 toward the yoke 122 in the axial direction. Similarly, the claws 152 of the yoke 122 are provided so as to extend from the yoke 122 toward the yoke 121 in the axial direction. The claws 151 and 152 are raised so as to be orthogonal to the annular plate portions of the yokes 121 and 122, and each circumferential width is narrowed gradually from a base portion connected to the annular plate portion of the yoke to a free end portion. Further, the claws 151 and 152 are located at a distance from the outer periphery of the magnet 11.

As shown in FIGS. 5A to 5C, the claws 151 of the yoke 121 are arranged at intervals of 45 degrees in the circumferential direction along the radially inner edge of the yoke 121. The claws 152 of the yoke 122 are arranged in the similar manner as the claws 151. The yoke 121 is positioned with respect to the yoke 122 such that the claws 151 and 152 are alternately arranged at an interval of 22.5 degrees. In the circumferential direction, a gap is present between the claws 151 and 152 so as not to contact the adjacent claws 151 and 152. Further, the claws 151 and 152 of the magnetic yokes 121 and 122 are arranged to have a distance from the adjacent claws 152 and 151, respectively.

Magnetic Flux Collector 13

As shown in FIGS. 3 and 4, the magnetic flux collector 13 is located between the pair of magnetic yokes 12 in the axial direction. The magnetic flux collector 13 is formed of a soft magnetic material (for example, permalloy) in a circular arc shape. The magnetic flux collector 13 is fixed to the output shaft 43 so that the center of the arc is coaxial with the output shaft 43.

As shown in FIGS. 5A to 5C, the magnetic flux collector 13 is formed in an arc shape along the radially outer peripheries of the yokes 121 and 122 located at a radially outermost position of the yoke 11 in a manner facing the claws 151 in the radial direction. Further, the magnetic flux collector 13 is shaped to have a width in the circumferential direction such that its angle from one end to the other end in the circumferential direction is a predetermined angle (60 degrees in the first embodiment) when viewed from an axial center, which is indicated by a one-dot chain line in FIG. 2 and an axis center of coaxial arrangement of the shafts 41, 43, the magnet 11 and the yoke 12. As shown in FIG. 6, the magnetic flux collector 13 is formed in a thin plate shape with a small thickness in the radial direction.

As shown in FIGS. 4 and 6, the magnetic flux collector 13 has a protrusion portion 13a, a side portion facing the yoke 121 in the axial direction and a side portion facing the yoke 122. The magnetic flux collector 13 is located to have a predetermined distance between the yoke 121 and the side portion 13b in the axial direction. In the axial direction, the distance from the side portion 13b on the input shaft 41 side of the magnetic flux collector 13 to the yoke 121 is d1.

In the axial direction, the protrusion portion 13a is provided at the center in the circumferential direction on the side portion 13c on the output shaft 43 side of the magnetic flux collector 13. The protrusion portion 13a is provided to protrude toward the output shaft 43 in the axial direction. The magnetic sensor 14 is located between the protrusion portion 13a and the yoke 122 in the axial direction.

As shown in FIG. 4, the distance from a tip of the protrusion portion 13a to the yoke 122 in the axial direction is d2 when the magnetic flux collector 13 is located between the magnetic yokes 121 and 122. In the side portion 13c of the magnetic flux collector 13 which is on the output shaft 43 side, the distance from a no-protrusion portion, in which the protrusion portion 13a is not provided, to the yoke 122 is d3. In the axial direction, the distance d2 from the free end of the protrusion portion 13a to the yoke 122 is shorter than the distance d3 from the no-protrusion portion to the yoke 122. That is, in the axial direction, the distance d2 from the magnetic flux collector 13 to the yoke 122 located on the opposite side of the magnetic sensor 14 is shorter by a length of the protrusion portion 13a in comparison to the distance d3 by which the magnetic flux collector 13 and the yoke 122 are separated and face each other.

Further, the distance d2 from the free end of the protrusion portion 13a to the yoke 122 is shorter than the distance between the yoke 121 and the yoke 122. Specifically, as shown in FIG. 6, the distance d2 from the free end of the protrusion portion 13a to the yoke 122 is shorter than a distance d4 between the yoke 121 and the yoke 122 in the axial direction. Further, as shown in FIG. 4, the distance d2 from the free end of the protrusion portion 13a to the yoke 122 is shorter than a distance d5 between the claws 151 and 152.

As shown in FIG. 4 or 6, the distance d2 from the free end of the protrusion portion 13a to the yoke 122 is shorter than a distance d6, which is from the free end of the claw 151 to the yoke 122 in the axial direction (or from the free end of the claw 152 to the yoke 121). As shown in FIG. 6, the distance d2 from the free end of the protrusion portion 13a to the yoke 122 is shorter than a distance d7 from the side surfaces of the claws 151 and 152 to the magnetic flux collector 13 in the radial direction. Similarly, the distance d1 from the side surface of the magnetic flux collector 13 on the input shaft 41 side to the yoke 121 is shorter than the distances d4 to d7. The distance d1 from the side surface of the magnetic flux collector 13 on the input shaft 41 side to the yoke 121 is shorter than the distance d2 from the free end of the protrusion portion 13a to the yoke 122.

As described above, leakage of the magnetic flux directly from the yoke 121 to the yoke 122 is reduced. For example, when the claws 151 face the N poles, the magnetic flux enters the yoke 121 from the N poles of the magnet 11 via the claws 151 and is collected from the yoke 121 to the magnetic flux collector 13. Then, the magnetic flux collected in the magnetic flux collector 13 is guided from the protrusion portion 13a to the yoke 122, and exits from the claws 152 of the yoke 122 to the south poles of the magnet 11. The same is true even when the polarity of the magnetic poles is changed.

Magnetic Sensor 14

The magnetic sensor 14 is located between the magnetic flux collector 13 and the yoke 122. More specifically, the magnetic sensor 14 is located between the protrusion portion 13a of the magnetic flux collector 13 and the yoke 122 in the axial direction. That is, the magnetic flux collector 13 and the yoke 122 are located on both sides of the magnetic sensor 14 in the axial direction. The magnetic sensor 14 is fixed to the tip end of the protrusion portion 13a of the magnetic flux collector 13. For example, the magnetic sensor 14 is integrally molded with the magnetic flux collector 13 by resin molding with the magnetic flux collector 13. More specifically, the magnetic sensor 14 is fixed on the side of the magnetic flux collector 13 opposite to the yoke 122 so as to detect the magnetic flux density between the yoke 122 and the magnetic flux collector 13.

The magnetic sensor 14 outputs a voltage signal in accordance with the detected magnetic flux density. As the magnetic sensor 14, for example, a Hall element, a magnetoresistive element or the like may used. The magnetic sensor 14 is arranged to detect the magnetic flux density in the axial direction. That is, the magnetic sensor 14 detects the magnetic flux density of the magnetic flux induced from the protrusion portion 13a to the yoke 122.

Detection Method

Here, the detection of the torsional torque by the magnetic sensor 14 will be described. First, it is assumed that the torsional torque is not applied between the input shaft 41 and the output shaft 43, that is, the torsion bar 42 is in the non-twisted neutral position. In this case, as shown in FIG. 5B, the centers of the claws 151 and 152 are located to coincide with the boundary between the N pole and the S pole of the magnet 11, respectively.

At this time, the claws 151 and 152 have the same areas facing the N pole and the same areas facing the S pole. That is, in the claws 151 and 152, the magnetic flux entering from the N pole of the magnet 11 and the magnetic flux exiting to the S pole are the same. For this reason, magnetic lines of force are closed inside the yokes 121 and 122, respectively. Therefore, the magnetic flux density detected by the magnetic sensor 14 becomes zero or very close to zero with almost no leakage of magnetic flux from the yokes 121 and 122 to external sides.

When the torsional torque is applied between the input shaft 41 and the output shaft 43 and the torsional displacement occurs in the torsion bar 42, the relative position between the magnet 11 and the pair of magnetic yokes 12 is circumferentially displaced. As a result, as shown in FIGS. 5A and 5C, the centers of the claws 151 and 152 provided on the magnetic yoke 12 do not coincide with the boundary between the N pole and the S pole of the magnet 11. At this time, the claws 151 and 152 have the same areas facing the N pole and the same areas facing the S pole. Thereby, in the yokes 121 and 122, the magnetic flux entering from the N pole and the magnetic flux exiting to the S pole are not equal.

For example, as shown in FIG. 5A, the claw 151 of the yoke 121 has a larger area facing the N pole than the S pole. Thus, the magnetic flux entering from the N pole is larger than that exiting from the S pole. On the other hand, the claw 152 of the yoke 122 has a larger area facing the S pole than the N pole. Thus, the magnetic flux entering from the N pole is smaller than the magnetic flux exiting from the S pole. As a result, the magnetic flux induced from the yoke 121 to the yoke 122 via the magnetic flux collector 13 increases, and the magnetic flux density detected by the magnetic sensor 14 between the magnetic flux collector 13 and the yoke 122 increases. At this time, the detected magnetic flux density increases according to a difference between the areas of the N pole and the S pole facing the claws 151 and 152. Same situation occurs in the case of FIG. 5C, although the polarity is opposite.

As described above, when the relative position of the magnetic yoke 12 relative to the magnet 11 is displaced in the circumferential direction, the magnetic flux density corresponding to the torsional displacement is detected between the magnetic flux collector 13 and the yoke 122 in the axial direction. The magnetic flux density detected by the magnetic sensor 14 is approximately proportional to the amount of torsional displacement of the torsion bar 42, and the polarity is reversed according to the twist direction of the torsion bar 42. The voltage of the voltage signal corresponds to the magnetic flux density, that is, to the amount of torsional displacement. Since the torsional torque is in proportion to the amount of torsional displacement, the voltage of the voltage signal also corresponds to the torsional torque. The torque detecting device 10 can thus output the voltage signal corresponding to the torsional torque.

When the magnetic sensor 14 detects the magnetic flux density of the magnetic flux which has passed through the magnetic flux collector 13, the detected magnetic flux density is averaged. That is, an error caused by the shape or the like of the magnetic yoke 12 is reduced, and the detection accuracy of the torsional torque can be improved. Further, since the magnetic flux passing through the magnetic yoke 12 is concentrated on the magnetic flux collector 13, the detectable magnetic flux density can be improved.

However, since the magnetic flux collector 13 is formed of a separate member from the magnetic yoke 12, a gap (air gap) is formed between the magnetic flux collector 13 and the magnetic yoke 12. When the gap is large, a magnetic resistance in the magnetic circuit increases. That is, the magnetic flux easily leaks in the gap, and the magnetic flux induced from the magnetic yoke 12 to the magnetic flux collector 13 decreases. Therefore, the magnetic flux density detectable by the magnetic sensor 14 is reduced.

For example, in one exemplary conventional device, a pair of magnetic flux collecting rings is provided. In this device, a total of three air gaps are formed between one yoke and one magnetic flux collecting ring, between the pair of magnetic flux collecting rings and between the other magnetic flux collecting ring and the other yoke. Therefore, more number of gaps are formed in a magnetic circuit as compared with the case where the magnetic sensor is located between the yokes. It thus becomes difficult to improve the detectable magnetic flux density. When it is difficult to detect the magnetic flux density, the detection accuracy of the torsional torque becomes low.

For this reason, in order to minimize the number of gaps between the yokes 121 and 122 in the first embodiment, the magnetic flux collector 13 is located to face both of the yoke 121 and the yoke 122, and the magnetic sensor 14 is located between the yoke 122 and the magnetic flux collector 13. That is, the yoke 121 and the yoke 122 are disposed on both sides of the magnetic flux collector 13. As a result, even in case that the magnetic flux collector 13 is provided, the number of gaps (air gaps) between the magnetic yokes 12 can be minimized to two. In the first embodiment, the magnetic sensor 14 is located between the magnetic flux collector 13 and the yoke 122, the yoke 122 operates as a first yoke, which is provided adjacently to the magnetic sensor, and the yoke 121 operates as a second yoke, which is provided adjacently to the magnetic flux collector 13.

The configuration described above provides the following effects.

The magnetic flux collector 13 is located to face the yoke 121 and the yoke 122 in the axial direction. The magnetic sensor 14 is located between the yoke 122 and the magnetic flux collector 13 and detects the magnetic flux density between the yoke 122 and the magnetic flux collector 13. Therefore, for example, the number of gaps (that is, air gaps in the magnetic circuit) between the magnetic yokes 12 can be reduced as compared with the case where the magnetic flux density between the pair of magnetic flux collectors is detected. Thereby, the magnetic sensor 14 can improve the ability of detection of the magnetic flux density.

More specifically, in case of detecting the magnetic flux density between the pair of magnetic flux collectors, a total of three gaps are formed between one yoke and one magnetic flux collector, between the pair of magnetic flux collectors, and between the other magnetic flux collector and the other yoke. On the other hand, as in the first embodiment, in case the magnetic flux collector 13 is located to face the yoke 121 and the yoke 122, respectively, a total of only two gaps are formed between the yoke 121 and the magnetic flux collector 13 and between the yoke 122 and the magnetic flux collector 13. Therefore, the gaps in the magnetic circuit can be reduced, and the ability of detecting the magnetic flux density can be improved.

The distance d1 between the magnetic flux collector 13 and the yoke 121, and the distances d2 and d3 between the magnetic flux collector 13 and the yoke 122 are all shorter than the distance d4 between the yokes 121 and 122. As a result, the magnetic flux does not leak directly from the yoke 121 to the yoke 122, and the ability of detecting the magnetic flux density between the yoke 122 and the magnetic flux collector 13 can be improved.

The distance d2 from the protrusion portion 13a of the magnetic flux collector 13 to the yoke 122 located on the opposite side of the magnetic sensor 14 is shorter than the distance d3 at which the magnetic flux collector 13 and the yoke 122 face each other. That is, the protrusion portion 13a extending in the axial direction toward the yoke 122 is formed in the magnetic flux collector 13, and the magnetic sensor 14 is located between the free end of the protrusion portion 13a and the yoke 122. For this reason, it is possible to concentrate the magnetic flux in the space in which the magnetic sensor 14 is located, and to improve the ability of detecting the magnetic flux density.

Further, since the magnetic flux passes through the magnetic flux collector 13, the magnetic flux density detected by the magnetic sensor 14 can be averaged. Furthermore, since the magnetic flux is collected from the yokes 121 and 122 by the magnetic flux collector 13, the ability of detecting the magnetic flux density can be improved.

Second Embodiment

In case that the direction in which the magnetic flux collector 13 faces the yoke 121 and the direction in which the magnetic flux collector 13 faces the yoke 122 are the same, the distance between the magnetic flux collector 13 and the yoke 121 and the distance between the magnetic flux collector 13 and the yoke 122 affect each other. In this case, it is often difficult to adjust the distances. That is, the adjustment of distances becomes difficult because narrowing one distance results in widening the other distance. For example, in case the yoke 121 and the yoke 122 are located on both sides of the magnetic flux collector 13 (both are opposed in the axial direction) as in the first embodiment described above, narrowing one distance results in widening the other distance and makes it difficult to adjust the references. For this reason, it takes time and effort to properly arrange the magnetic flux collectors 13 so that both have appropriate distances.

The distance d2 between the magnetic flux collector 13 and the yoke 122 (the distance in which the magnetic sensor 14 is located) is preferably as short as possible so that the magnetic sensor 14 can detect the magnetic flux density more accurately. On the other hand, it is preferred that the distance d1 between the magnetic flux collector 13 and the yoke 121 and the distances d2 and d3 between the magnetic flux collector 13 and the yoke 122 are all smaller than the distances d4 to d6 between the yokes 121 and 122. Also from this point, it takes time and effort to arrange the magnetic flux collector 13 properly so as to have appropriate distances.

In case the magnetic sensor is located between the pair of magnetic flux collectors, the number of places where the gap is formed is increased (three locations) as exemplified in the conventional device described above. As a result, the magnetic sensor can be located with higher freedom and adjusted relatively easily in comparison to the case where the magnetic flux collector 13 is arranged to face both of the yoke 121 and the yoke 122. That is, even in case the distance between the pair of magnetic flux collectors is minimized, it is possible to adjust the distance in the other two gaps.

Therefore, according to a second embodiment, the yokes 121, 122 and the magnetic flux collector 13 are configured in different shapes from the first embodiment. The second embodiment will be described in detail with reference to FIG. 7.

Yokes 121, 122

Figure 7:
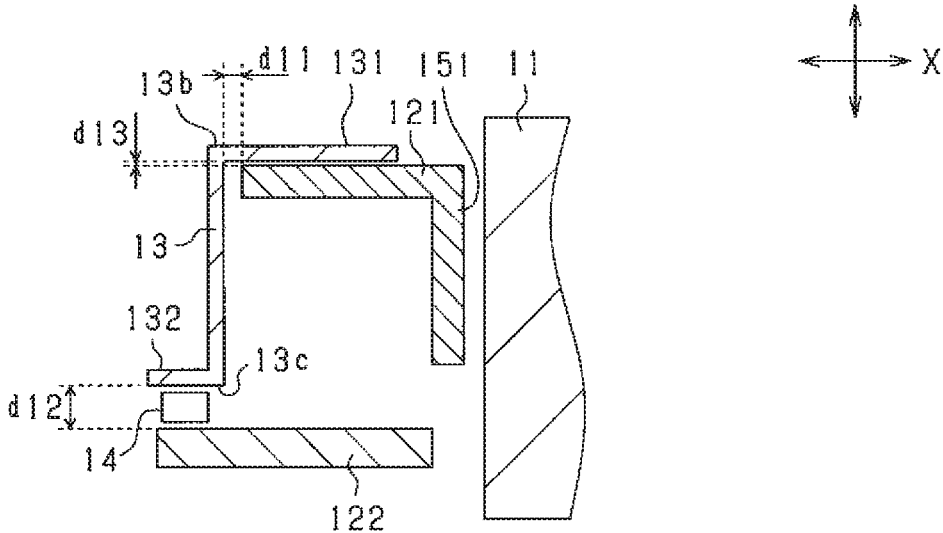
FIG. 7 is an end surface view of a cut portion of the magnetic yoke according to a second embodiment.

The yokes 121 and 122 in the second embodiment will be described below. As shown in FIG. 7, the yokes 121 and 122 are provided so that the distances from the axial center of the output shaft 42 to the outer edge in the radial direction are different. Specifically, the outer diameter of the yoke 121 is shorter than the outer diameter of the yoke 122. That is, in the radial direction, the distance from the axial center to the outer edge of the yoke 121 is shorter than the distance from the axial center to the outer edge of the yoke 122. For this reason, the yoke 122 protrudes beyond the yoke 121 in the radial direction, and the radially outer peripheral portion of the yoke 122 does not overlap the yoke 121 in the axial direction.

Magnetic Flux Collector 13

As in the first embodiment, the magnetic flux collector 13 is formed of the soft magnetic material in the arc shape so that the center of the arc is coaxial with the output shaft 43, and is fixed to the output shaft 43 side. The magnetic flux collector 13 is formed in a thin plate shape with a small thickness in the radial direction. Further, the magnetic flux collector 13 is shaped to have a width in the circumferential direction such that its angle from one circumferential end to the other circumferential end in the circumferential direction is limited to a predetermined angle (60 degrees in the second embodiment) when viewed from the axial center.

As shown in FIG. 7, the magnetic flux collector 13 is located radially outside of the yoke 121, the distance of which from the axial center to the outer edge in the radial direction is shorter, and radially inside of the outer edge of the yoke 122, the distance of which from the axial center to the outer edge is longer than the yoke 121. Specifically, the magnetic flux collector 13 is located radially outside the yoke 121 at a constant distance d11, and is formed in the arc shape along the outer periphery of the yoke 121. In addition, the magnetic flux collector 13 is located between the outer edge and the inner edge of the yoke 122 in the radial direction and outside the yoke 121 in the radial direction. Thus, the magnetic flux collector 13 is formed in the arc shape along the outer circumferential edge of the yoke 122. The distance from the radially inner surface of the magnetic flux collector 13 to the yoke 121 in the radial direction is d11.

Further, one axial side part (end portion) of the magnetic flux collector 13 is located between the yoke 121 and the yoke 122 in the axial direction and the other axial side part (end portion) 13c of the magnetic flux collector 13 is located outside the yoke 121. Specifically, in the axial direction, the side portion 13c of the magnetic flux collector 13 on the output shaft 43 side is located between the yokes 121 and 122. More specifically, the side portion 13c on the output shaft 43 side of the magnetic flux collector 13 is located at a position separated from the surface on the input shaft 41 side of the yoke 122 by a predetermined distance d12. Thus, the side portion 13c of the magnetic flux collector 13, which is on the output shaft 43 side, axially faces the surface of the yoke 122, which is on the input shaft 41 side. The distance from the yoke 122 to the magnetic flux collector 13 is kept constant at a distance d12 over an angular range from the end to the end in the circumferential direction of the magnetic flux collector 13.

The side portion 13b of the magnetic flux collector 13, which is on the input shaft 41 side, protrudes in the input shaft 41 side more than the yoke 121 in the axial direction. Thus, the radially inner surface of the magnetic flux collector 13 radially faces the radially outer edge portion of the yoke 121. The distance from the yoke 121 to the magnetic flux collector 13 is maintained constant at the distance d11 over a range from end to end in the circumferential direction of the magnetic flux collector 13.

In addition, the magnetic flux collector 13 has a first flange portion 131 that protrudes radially inward (toward the magnet 11) from side portion 13b on the input shaft 41 side, that is, in parallel with the yoke 121. The first flange portion 131 is located closer to the input shaft 41 than the yoke 121 in the axial direction, and is provided from end to end of the magnetic flux collector 13 in the circumferential direction. The first flange portion 131 is opposed to the surface of the yoke 121 on the input shaft 41 side in the axial direction. A distance from the first flange portion 131 to the yoke 121 in the axial direction is d13.

The magnetic flux collector 13 further has a second flange portion 132. The second flange portion 132 protrudes radially outward, that is, oppositely to the first flange portion 131. The second flange portion 132 is formed on the side portion 13c of the magnetic flux collector 13 on the output shaft 43 side. that protrudes radially outward from the free end of the magnetic flux collector 13, which is opposite to the side portion 13b and on the output shaft 43 side in the axial direction. That is, in the axial direction, the free end of the magnetic flux collector 13 and the position of the second flange portion 132 coincide.

The second flange portion 132 is located closer to the input shaft 41 than the yoke 122 in the axial direction (located between the yoke 121 and the yoke 122). Further, the second flange portion 132 is provided from end to end of the magnetic flux collector 13 in the circumferential direction. The second flange portion 132 is opposed to the surface of the yoke 122 on the input shaft 41 side in the axial direction. Further, the magnetic sensor 14 is located between the second flange portion 132 and the yoke 122 at the circumferential center of the magnetic flux collector 13. The magnetic sensor 14 detects the magnetic flux density between the second flange portion 132 of the magnetic flux collector 13 and the yoke 122 in the same manner as in the first embodiment.

The distance d12 from the side portion 13c (and the second flange portion 132) of the magnetic flux collector 13, which is on the output shaft 43 side of the magnetic flux collector 13, to the yoke 122 is shorter than the distance between the yoke 121 and the yoke 122. Specifically, the distance d12 from the second flange portion 132 to the yoke 122 is shorter than the distances d4 to d7. Further, the distance d11 in the radial direction from the radial inner surface of the magnetic flux collector 13 to the yoke 121 is also shorter than the distances d4 to d7 described in the first embodiment. Further, in the axial direction, the distance d13 from the first flange portion 131 to the yoke 121 is also shorter than the distances d4 to d7. Thus, leakage of the magnetic flux from the yoke 121 to the yoke 122 is reduced.

The configuration of the second embodiment described above provides the following effects.

In the second embodiment, the direction in which the magnetic flux collector 13 faces the yoke 121 is made different from the direction in which the magnetic flux collector 13 faces the yoke 122. Specifically, in order to make the magnetic flux collector 13 face the yokes 121 and 122 in two different directions, the yokes 121 and 122 are configured so that the yoke 122 protrudes outward beyond the yoke 121 in the radial direction and the yokes 121 and 122 are spaced apart in the axial direction.

Further, the magnetic flux collector 13 is located between the outer edge and the inner edge of the yoke 122 in the radial direction and radially outside the yoke 121. The side portion 13c of the magnetic flux collector 13 on the output shaft 43 side is located between the yoke 121 and the yoke 122 in the axial direction, and the side portion 13b of the magnetic flux collector 13 on the input shaft 41 side is configured to protrude to the input shaft 41 side more than the yoke 121.

The magnetic flux collector 13 is made to face the yoke 122 in the axial direction, and to face the yoke 121 in the radial direction. More specifically, the side portion 13c (that is, the second flange portion 132) of the magnetic flux collector 13 on the output shaft 43 side is axially opposed to the surface of the yoke 122, which is on the input shaft 41 side. Further, the radially inner surface of the magnetic flux collector 13 is made to face the outer edge of the yoke 121 in the radial direction.

Accordingly, even in case the distance between the magnetic flux collector 13 and the yoke 122 in the axial direction is adjusted, the distance between the magnetic flux collector 13 and the yoke 121 in the radial direction is not affected. That is, even in case the magnetic flux collector 13 is moved in the axial direction in order to adjust the distance between the magnetic flux collector 13 and the yoke 122, the distance between the magnetic flux collector 13 and the yoke 121 in the radial direction does not change. Further, even in case the magnetic flux collector 13 is moved in the radial direction in order to adjust the distance between the magnetic flux collector 13 and the yoke 121, the distance between the magnetic flux collector 13 and the yoke 122 in the axial direction does not change.

For this reason, even in case the distance between one magnetic yoke 121 or 122 and magnetic flux collector 13 need be properly adjusted, it is possible to adjust the distance between the other yoke 121 or 122 and the magnetic flux collector 13 easily because the facing direction is different. Further, it is easier to position the magnetic flux collector 13 as compared with the case of facing in one direction, because the magnetic flux collector 13 is positioned to face the yokes 121 and 122 in two different directions.

Further, the positions of the outer edges of the yokes 121 and 122 are made different in the radial direction, and the magnetic flux collector 13 is located outside the yoke 121 in the radial direction and between the outer edge and the inner edge of the yoke 122. Thus, the magnetic flux collector 13 is located by moving the magnetic flux collector 13 in the axial direction from the input shaft 41 side of the magnetic yoke 12 or by moving the magnetic flux collector 13 from the radially outer side in the radial direction. In addition, it is possible to move the magnetic flux collector 13 in a direction oblique to the axial direction and the radial direction. As described above, the direction of moving the magnetic flux collector 13 at the time of arranging the magnetic flux collector 13 in the magnetic yoke 12 is not limited in one direction, and assembling of the magnetic flux collector 13 becomes easy.

The magnetic flux collector 13 is configured to face the yoke 121 at a plurality of opposing locations. The plurality of opposing locations face the yoke 121 in two different directions (axial direction and radial direction). That is, the magnetic flux collector 13 radially faces the outer edge of the yoke 121 on the radially inner surface, and axially faces the yoke 121 by the first flange portion 131. Therefore, even in case the distance between the yoke 121 and the magnetic flux collector 13 increases in any one direction, it is possible to collect the magnetic flux from the yoke 121 as far as the distance between the yoke 121 and the magnetic flux collector 13 in the other direction is short. For example, even in case that the magnetic flux collector 13 is moved in the radial direction, the magnetic flux can be collected from the yoke 121 via the first flange portion 131. For this reason, positioning of the magnet collection part 13 is simplified.

Further, the magnetic flux collector 13 is provided with the second flange portion 132 protruding radially outward. Thereby, in the radial direction, the area that is opposed to the yoke 122 can be increased, and the position adjustment of the magnetic flux collector 13 can be easily performed. Further, by providing the second flange portion 132, the radial thickness of the magnetic flux collector 13 can be reduced.

Other Embodiment

The torque detecting device 10 according to the present disclosure is not limited to the embodiments described above, and may be implemented as follows, for example. In the following description, parts identical or equivalent to each other in the above-described embodiments are denoted by the same reference numerals, and the description of the parts denoted by the same reference numerals will be omitted.

Figure 8:
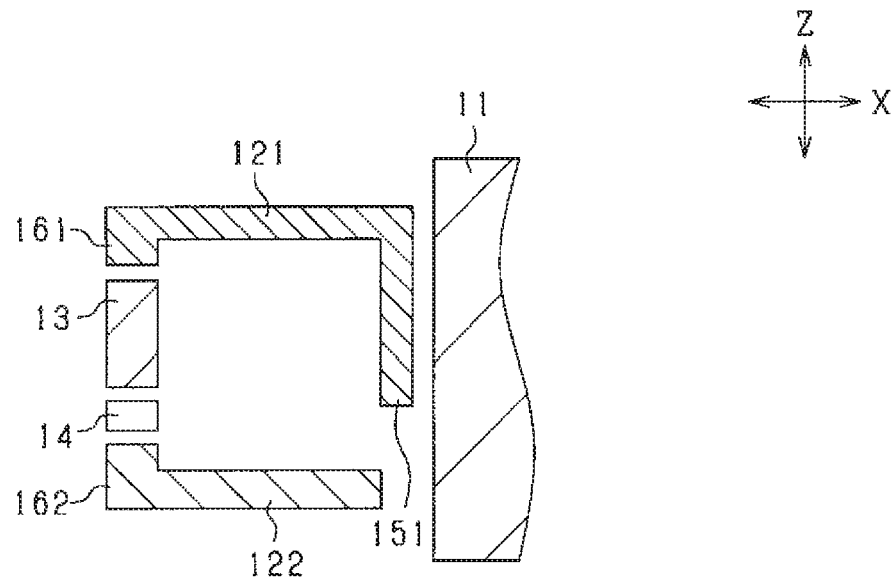
FIG. 8 is an end surface view of the cut portion of the magnetic yoke according to a first modification example.

(1) In the above embodiments, the yokes 121 and 122 may be modified to have extension portions extending from the yokes 121 122 to the magnetic flux collector 13. For example, as a first modification example shown in FIG. 8, extension portions 161 and 162 are formed to extend from the outer edge of the yokes 121 and 122 toward the other yokes 121 and 122 in the axial direction, respectively. The extension portions 161 and 162 may be provided along the entire circumference of the yokes 121 and 122, or may be provided only at locations where the magnetic flux collector 13 is located. The magnetic flux collector 13 may be located between the extension portions 161 and 162. The magnetic sensor 14 may be disposed between the magnetic flux collector 13 and the extension portion 161 or 162. In FIG. 8, the magnetic sensor 14 is located between the magnetic flux collector 13 and the extension portion 162 of the yoke 122.

(2) In the first embodiment, the protrusion portion 13a may be eliminated as a second modification example.

(3) In the above embodiments, the magnetic sensor 14 may be located adjacently to the yoke 121. For example, in the first embodiment, the magnetic sensor 14 may be located between the yoke 121 and the magnetic flux collector 13 to detect the magnetic flux density in the axial direction. In this case, the yoke 121 is provided as the first yoke, and the yoke 122 is provided as the second yoke.

Figure 9:
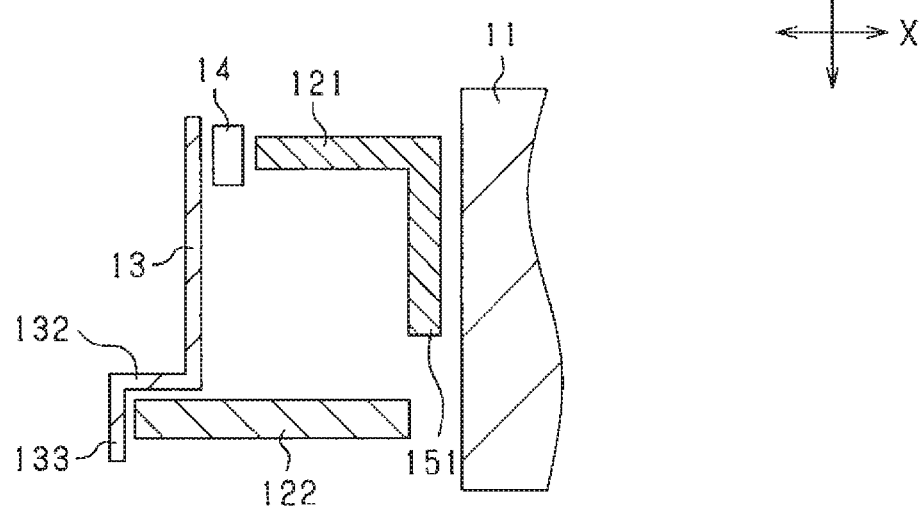
FIG. 9 is an end surface view of the cut portion of the magnetic yoke according to a third modification example.

Further, in the second embodiment, the magnetic sensor 14 may be located between the radially inner surface of the magnetic flux collector 13 and the outer edge of the yoke 121 to detect the magnetic flux density in the radial direction. In this case, as a third modification example shown in FIG. 9, the first flange portion 131 may be omitted. Further, a third flange portion 133 may be provided to protrude from the radially outer end of the second flange portion 132 in the axial direction toward the output shaft 43. The third flange portion 133 is located radially outside the outer edge of the yoke 122 and faces the yoke 122 in the radial direction. Further, the third flange portion 133 is provided from end to end of the magnetic flux collector 13 in the circumferential direction. Thus, the magnetic flux collector 13 is opposed to the yoke 122 in two different directions (axial direction and radial direction).

Figure 10:
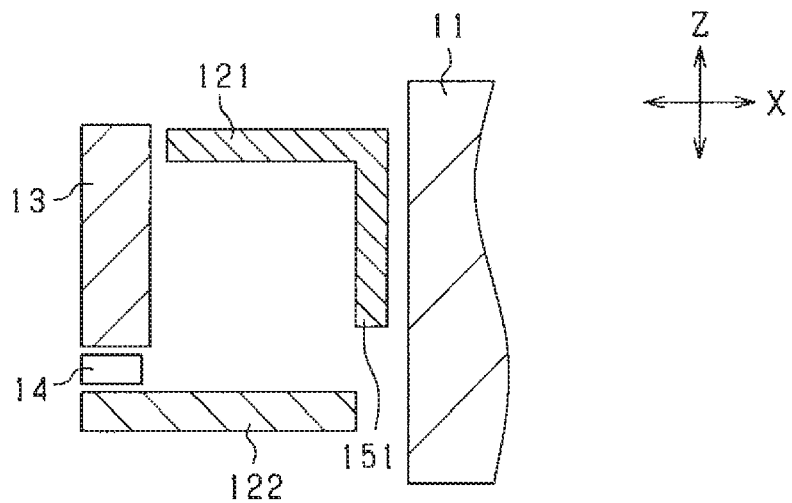
FIG. 10 is an end surface view of the cut portion of the magnetic yoke according to a fourth modification example.

(4) In the second embodiment, as a fourth modification example shown in FIG. 10, the first flange portion 131 and the second flange portion 132 may be omitted. In this case, it is desirable that the radial thickness of the magnetic flux collector 13 is equal to a thickness corresponding to a radial length of the magnetic sensor 14. In FIG. 10, the radial thickness of the magnetic flux collector 13 and the radial length of the magnetic sensor 14 are the same. Alternatively, the magnetic sensor 14 may be located between the radially inner surface of the magnetic flux collector 13 and the radially outer edge of the yoke 121 so that the magnetic sensor 14 detects the magnetic flux density in the radial direction.

Figure 11:
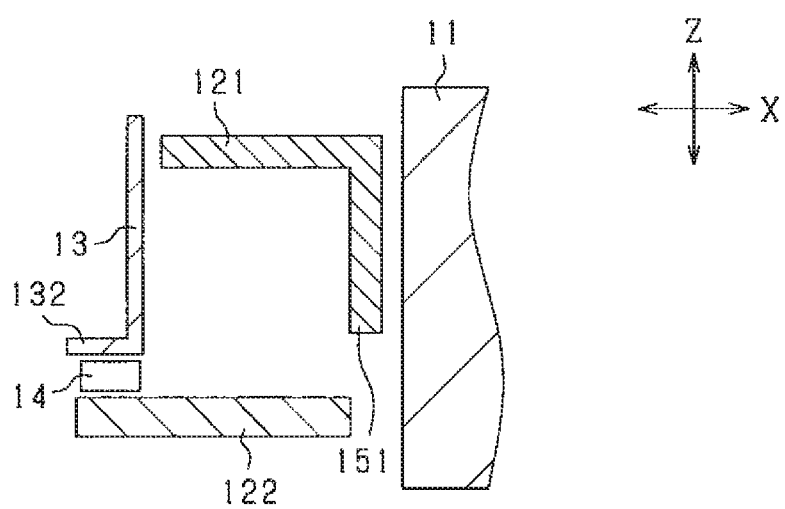
FIG. 11 is an end surface view of the cut portion of the magnetic yoke according to a fifth modification example.

(5) In the second embodiment, as a fifth modification example shown in FIG. 11, the first flange portion 131 may be omitted. Alternatively, differently from the arrangement shown in FIG. 11, the magnetic sensor 14 may be located between a radially inner surface of the magnetic flux collector 13 and the radially outer edge of the yoke 121 so that the magnetic sensor 14 detects the magnetic flux density in the radial direction.

Figure 12:
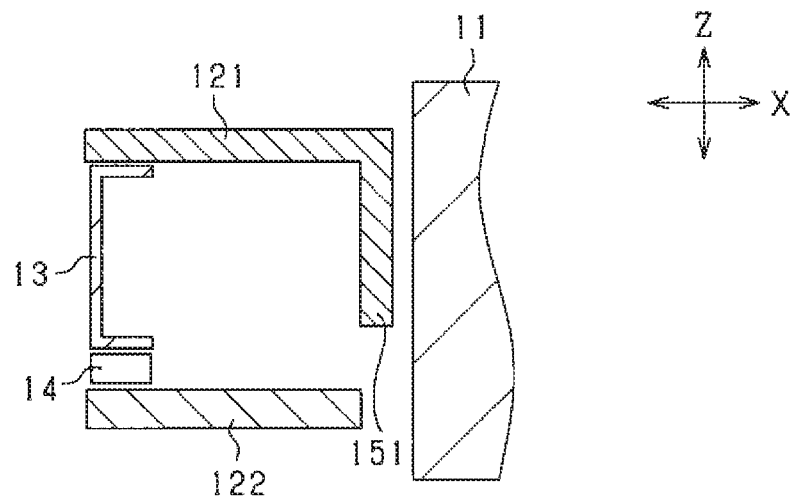
FIG. 12 is an end surface view of the cut portion of the magnetic yoke according to a sixth modification example.

(6) In the above embodiments, the shape of the magnetic flux collector 13 may be arbitrarily changed as long as it faces the yokes 121 and 122. For example, a recess may be provided radially inward or outward. FIG. 12 illustrates, as a sixth modification example, the magnetic flux collector 13 in which the recess is provided on the radially inner side (magnet 11 side). Further, the magnetic flux collector 13 may be formed in a ring shape or in a flat plate shape.

Figure 13:
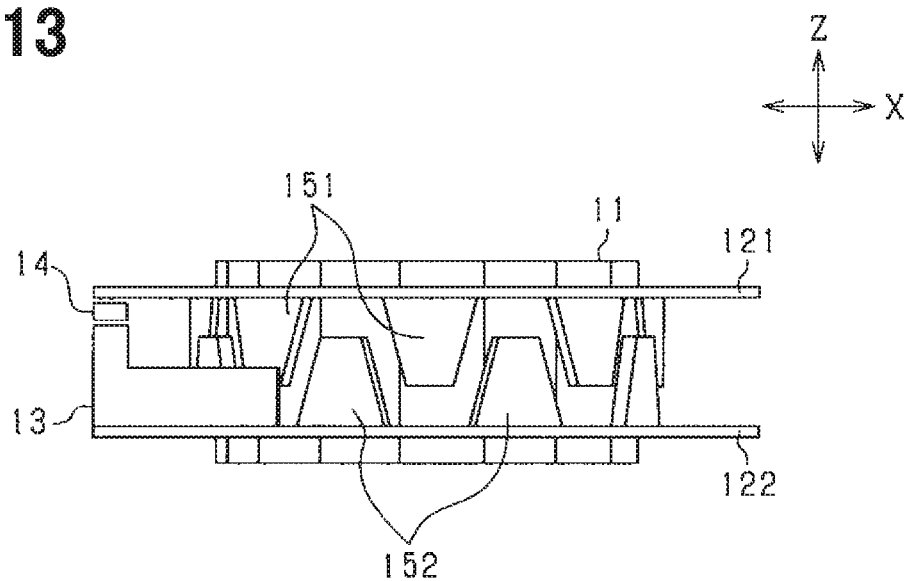
FIG. 13 is an end surface view of the cut portion of the magnetic yoke according to a seventh modification example.

(7) In the above embodiments, the magnetic flux collector 13 may be provided on the yoke 122 side as a seventh modification example shown in FIG. 13.

Figure 14A:
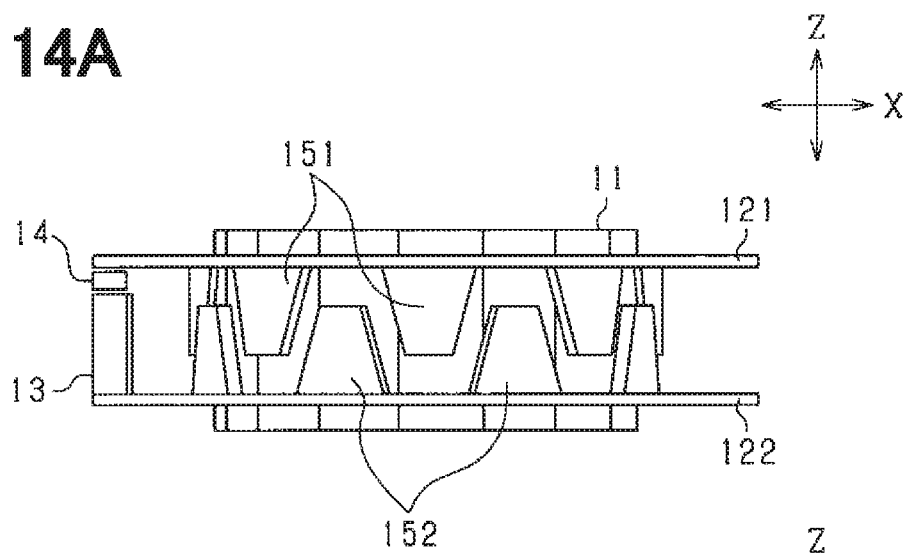
FIG. 14A and FIG. 14B are side views of the magnetic yoke and the magnet according an eighth modification example.
Figure 14B:
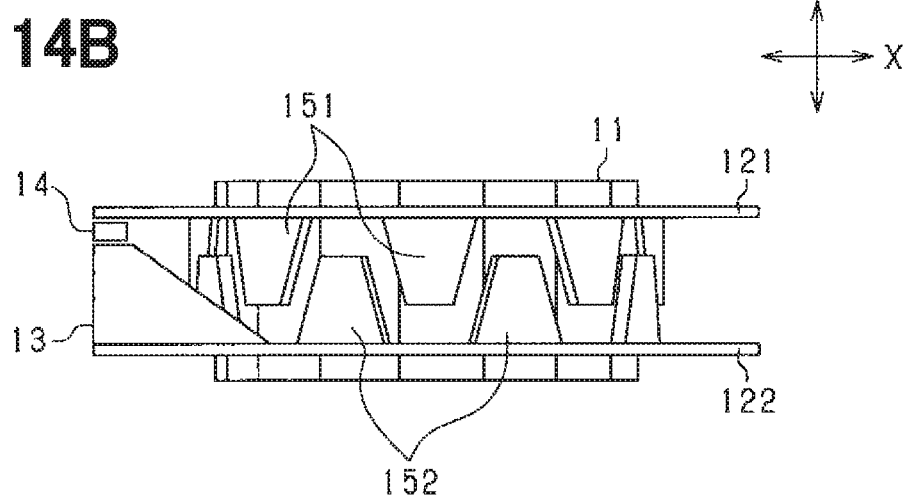

(8) In the above embodiments, the shape of the magnetic flux collector 13 may be arbitrarily changed as an eighth modification example. For example, as shown in FIG. 14A, the width of the magnetic flux collector 13 in the circumferential direction may be arbitrarily changed. In FIG. 14A, the width of the magnetic flux collector 13 in the circumferential direction is matched to the width of the magnetic sensor 14. Further, as shown in FIG. 14B, the shape may be such that it is inclined from the circumferential end of the magnetic flux collector 13 toward a portion, which faces the magnetic sensor 14. That is, the magnetic flux collector 13 may be formed such that the distance between the magnetic flux collector 13 and the yoke 121 is gradually shortened as it approaches a portion facing the magnetic sensor 14 from the circumferential end of the magnetic flux collector 13. The magnetic flux collector 13 is formed preferably symmetrically to right and left in the circumferential direction.

What is claimed is:

1. A torque detecting device for detecting a torsional torque between a first shaft and a second shaft based on a torsional torque of a resilient member, which connects the first shaft and the second shaft coaxially, the torque detecting device comprising:

a magnet fixed to the first shaft;
a first yoke fixed to the second shaft and arranged to be rotatable relative to the magnet;
a second yoke fixed to the second shaft and arranged to be rotatable with the first yoke relative to the magnet;
a magnetic flux collector for collecting magnetic flux; and
a magnetic sensor for detecting a magnetic flux density, wherein:
the magnetic flux collector is located to face the first yoke and the second yoke;
the magnetic sensor is located between the first yoke and the magnetic flux collector to detect the magnetic flux density between the first yoke and the magnetic flux collector;
the first yoke and the second yoke are separated in the axial direction and located to have different distances in a radial direction from an axial center of the second shaft to radially outermost edges of the first yoke and the second yoke;
the magnetic flux collector is located radially outside the second yoke, a distance of the outermost edge of which is shorter from the axial center of the second shaft, and radially inside the first yoke, a distance of the outermost edge of which is longer from the axial center of the shaft; and
the magnetic flux collector has one end portion located between the first yoke and the second yoke in the axial direction and an other end portion located outside the second yoke in the axial direction.

2. The torque detecting device according to claim 1, wherein:
a distance in the axial direction between the magnetic flux collector and the first yoke and a distance in the axial direction between the magnetic flux collector and the second yoke are both shorter than a distance in the axial direction between the first yoke and the second yoke.

3. The torque detecting device according to claim 1, wherein:
the magnetic flux collector has a pair of flanges protruding from the one end portion and the other end portion, one of the pair of flanges protruding from the one end portion protrudes in a radially outward direction and an other of the pair of flanges protruding from the other end portion protrudes radially inward.

4. The torque detecting device according to claim 1, wherein:
the magnetic flux collector faces the first yoke and the second yoke in different directions.

5. The torque detecting device according to claim 1, wherein:
the magnetic flux collector is configured to face the second yoke at a plurality of facing locations, which faces the second yoke in different directions.

6. The torque detecting device according to claim 1, wherein:
a distance from the magnetic flux collector to the first yoke in the axial direction is shorter at a position where the magnetic sensor is located than at a position where the magnetic sensor is not located.

7. The torque detecting device according to claim 1, wherein:
the magnetic flux collector and the magnetic sensor are formed integrally; and
the magnetic sensor is fixed to a side of the magnetic flux collector, which faces the first yoke in the axial direction, to detect the magnetic flux density between the first yoke and the magnetic flux collector.

8. The torque detecting device according to claim 1, wherein:
the magnetic flux collector has a pair of flange portions protruding from the one end portion and the other end portion in parallel with the first yoke and the second yoke, respectively, and in opposite directions in the radial direction.

9. The torque detecting device according to claim 8, wherein:
the magnetic sensor is located axially adjacently to one of the pair of flange portions of the magnetic flux collector extending radially outwardly.

10. The torque detecting device according to claim 8, wherein:
the magnetic flux collector faces the one of the first yoke and the second yoke in both of the radial direction and the axial direction.

11. A torque detecting device for detecting a torsional torque between a first shaft and a second shaft based on a torsional torque of a resilient member, which connects the first shaft and the second shaft coaxially, the torque detecting device comprising:
a magnet fixed to the first shaft;
a first yoke fixed to the second shaft and arranged to be rotatable relative to the magnet;
a second yoke fixed to the second shaft and arranged to be rotatable with the first yoke relative to the magnet;
a magnetic flux collector for collecting magnetic flux; and
a magnetic sensor for detecting a magnetic flux density, wherein:
the magnetic sensor is located between one end portion of the magnetic flux collector and the first yoke in one of a radial direction and an axial direction relative to the first shaft and the second shaft to detect the magnetic flux density between the magnetic flux collector and the first yoke; and
the magnetic flux collector is located between the first yoke and the second yoke in the axial direction and includes a flange portion extending radially in parallel with the second yoke from another end portion which is opposite to the one end portion in the axial direction.

12. The torque detecting device according to claim 11, wherein:
the first yoke and the second yoke has different lengths in the radial direction.

13. The torque detecting device according to claim 12, wherein:
the radial length of the second yoke is shorter than that of the first yoke; and
the flange portion of the magnetic flux collector is located axially outside the second yoke and protrudes radially inwardly from the another end portion; and
the magnetic sensor is located between the magnetic flux collector and the first yoke in the axial direction.

14. The torque detecting device according to claim 12, wherein:
the radial length of the first yoke is shorter than that of the first yoke; and
the flange portion of the magnetic flux collector is located axially inside the second yoke and protrudes radially outwardly from the another end portion; and
the magnetic sensor is located between the magnetic flux collector and the first yoke in the radial direction.

* * * * *